April 3, 1928. 1,664,766

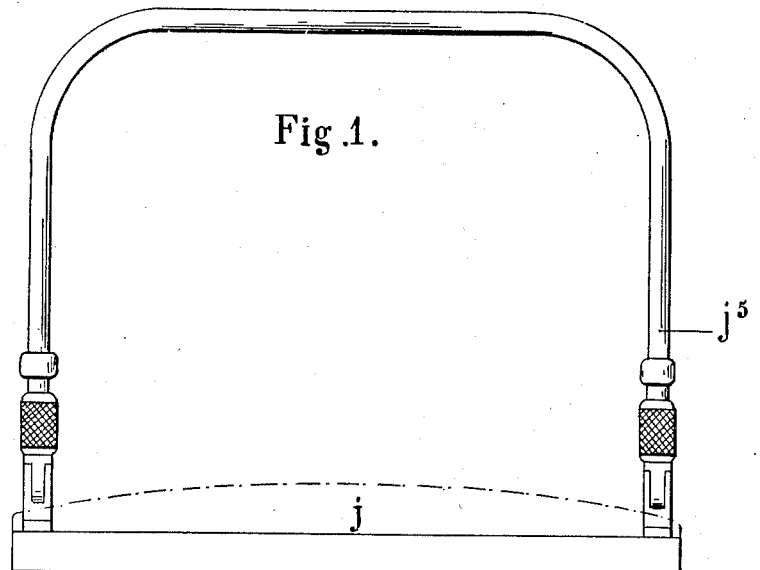
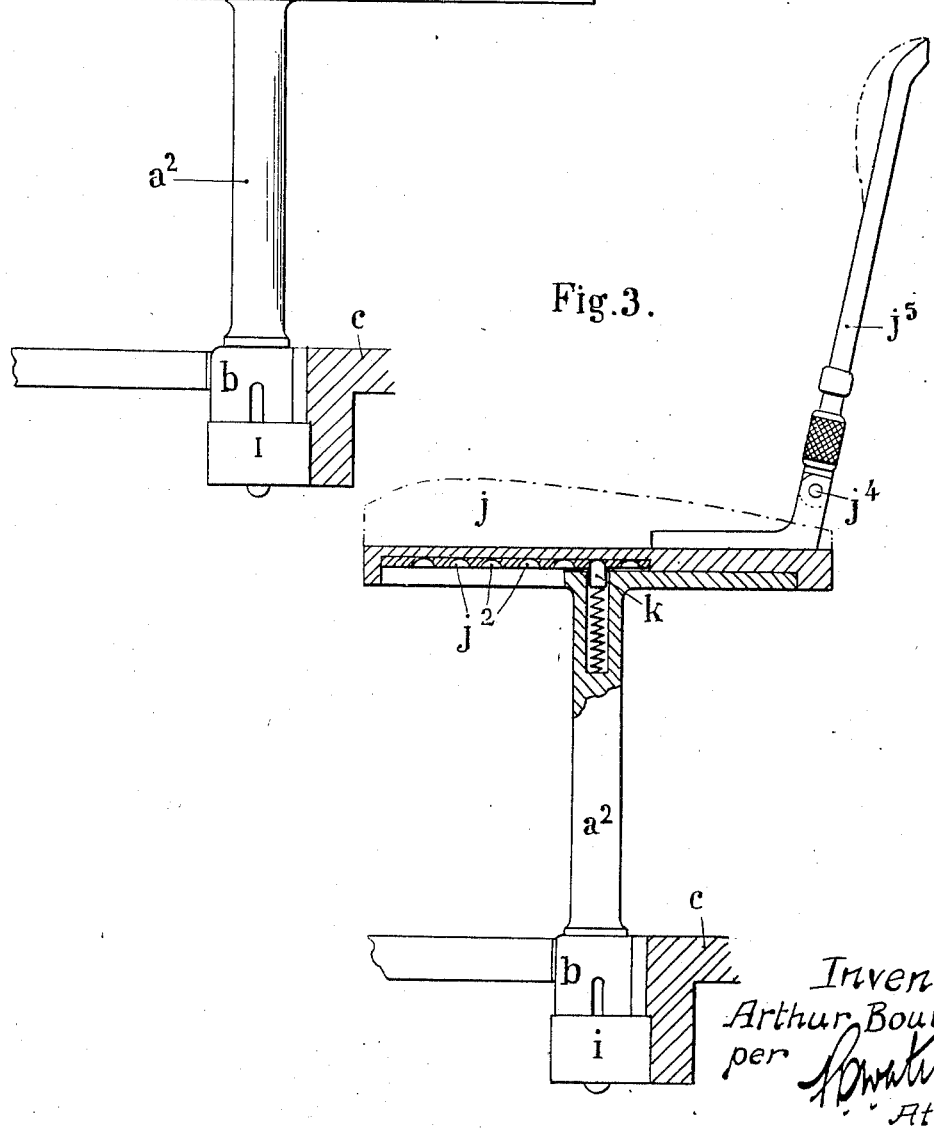

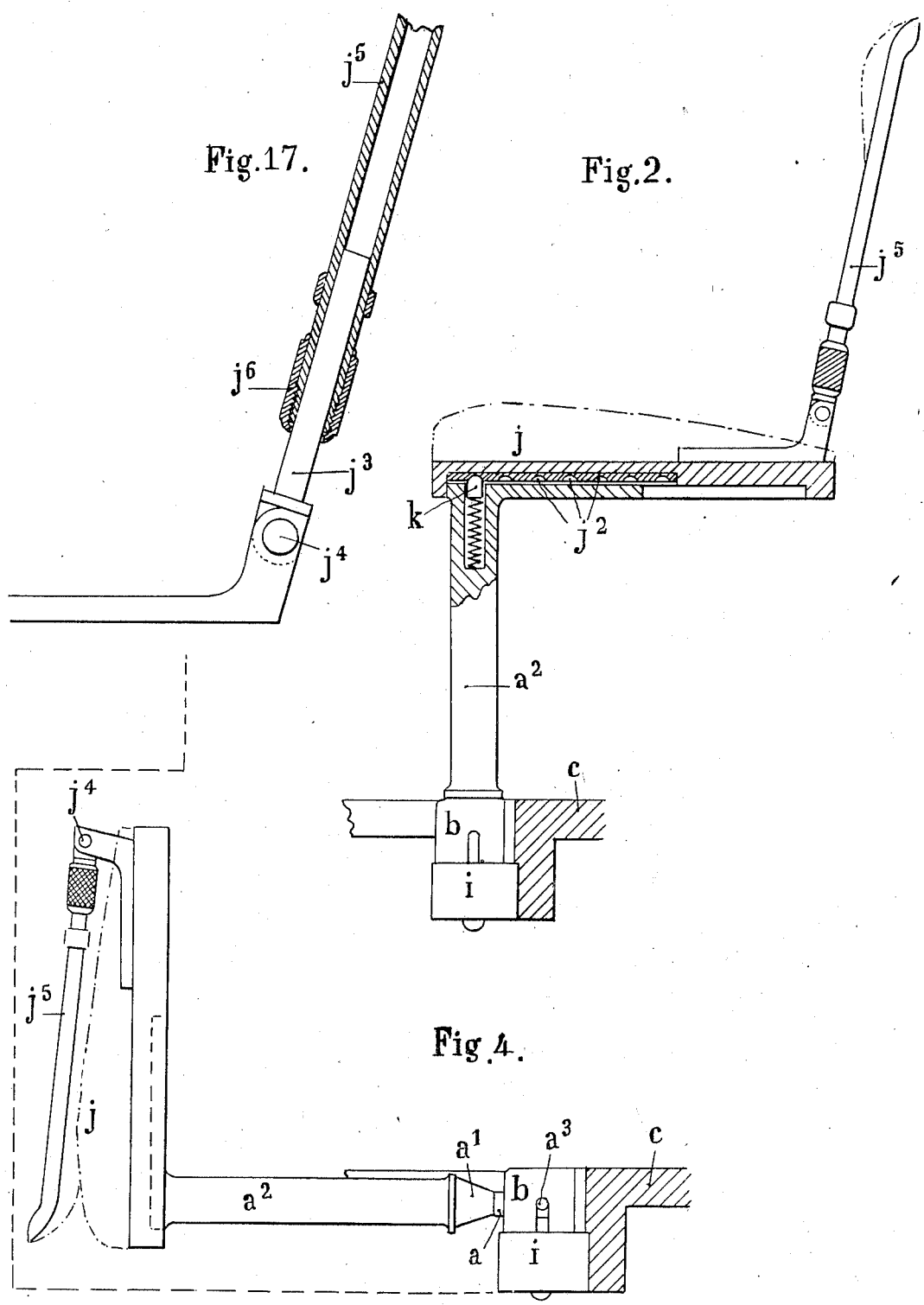

A. BOULOGNE

PIVOTING EMERGENCY SEAT

Filed Jan. 6, 1926 4 Sheets-Sheet 3

Inventor.
Arthur Boulogne.
per
Attorney.

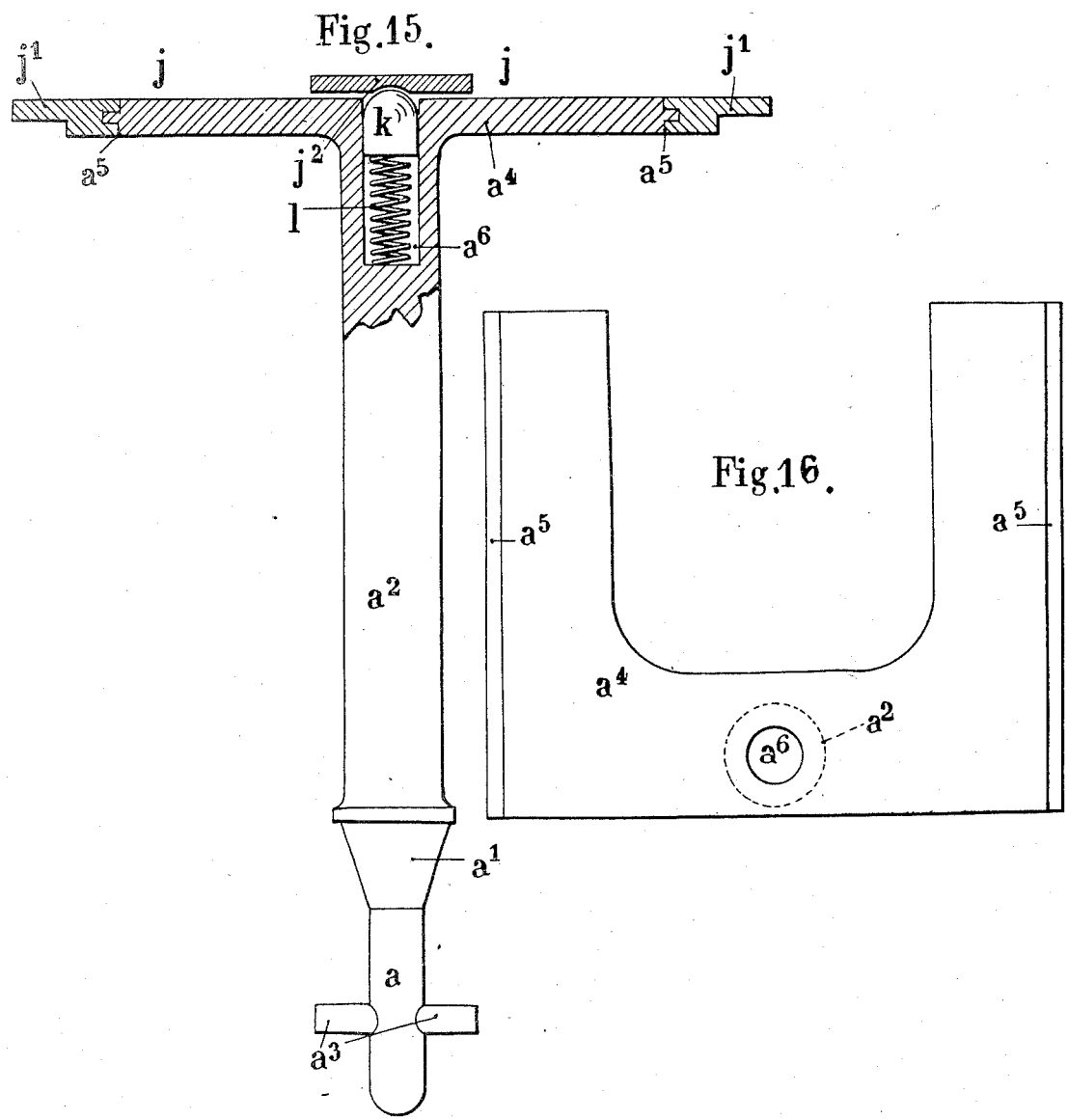

Patented Apr. 3, 1928.

1,664,766

UNITED STATES PATENT OFFICE.

ARTHUR BOULOGNE, OF LEVALLOIS-PERRET, FRANCE.

PIVOTING EMERGENCY SEAT.

Application filed January 6, 1926, Serial No. 79,606, and in France January 14, 1925.

The various forms of emergency seats used up to now, particularly in motor cars, do not give entire satisfaction as far as their sitting comfort, their concealment and their operation are concerned.

This invention has for an object a type of emergency seat in which these various inconveniences are avoided.

This emergency seat is characterized by the following features:

1. A spindle or support mounted on a cone and pivot permitting the pivoting of this spindle and to permit of the emergency seat being folded forward for concealing it or putting it out of the way.

2. A device for adjusting the horizontal projection of the seat.

3. A brake device preventing the emergency seat accidentally turning horizontally under the action of the rolling motion of the car when it is placed facing forward, that is to say in the longitudinal direction of the car.

The advantages of this system of pivoting emergency seat are the following:

Its support on a spindle and a cone as well as the displacement of its seat allows of the seat being folded into a minimum space. It may provide an emergency seat pivoting in any direction, in closed cars of small dimensions and particularly in cars with a cab body.

It permits also in closed cars, owing to the ease with which it is concealed or put out of the way, the arrangements of a front window glass falling completely and vertically in its recess or casing.

The displacement of the seat from the rear to the front allows moreover, in a closed car, the passengers seated on the rear seat to go out of the car without putting the emergency seats out of the way and without compelling the passengers seated on the said emergency seats to get out of the car.

This system of emergency seat is also applicable to the construction of all seats which have to be rapidly displaced, particularly armchairs for offices, draughtsman seats, etc.

Moreover, it is possible to cause the emergency seat to pivot in all directions, the passenger remaining seated.

Finally, its operation is very easy.

This invention will be described hereinafter, by way of example, with reference to the accompanying drawing in which:

Fig. 1 illustrates in front view this type of emergency seat in its raised position.

Fig. 2 is a side view thereof, the seat being completely pushed backward.

Fig. 3 is a side view, the seat being brought completely forward.

Fig. 4 shows the emergency seat folded that is to say concealed in its front window recess.

Fig. 15 shows separately, in elevation and partly in section, the spindle or support of this emergency seat.

Fig. 16 is a plan view thereof.

Fig. 17 illustrates, partly in section, a detail of the back of the said emergency seat.

Figure 5:
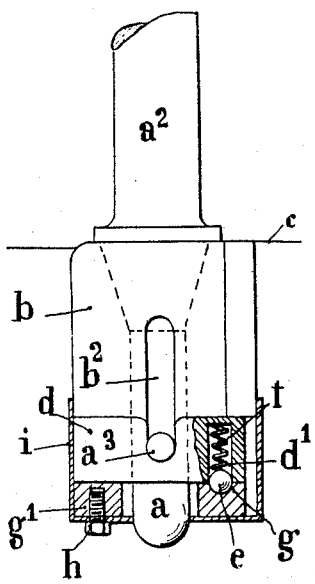
Fig. 5 shows separately, partly in section, the pivoting device of the support or spindle of this emergency seat.
Figure 6:
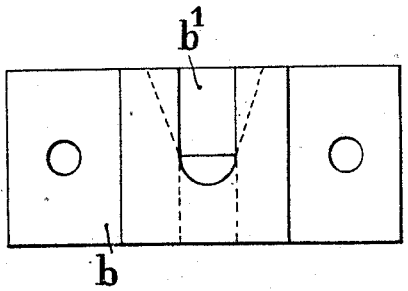
Fig. 6 illustrates separately in front view a bearing in which the spindle is capable of pivoting.
Figure 8:
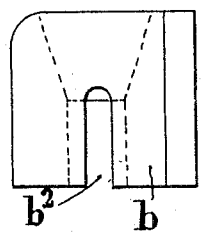
Fig. 8 is a side view
Figure 7:
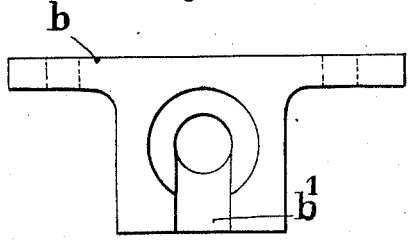
Fig. 7 is a plan view thereof.
Figure 9:
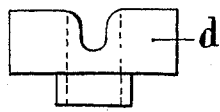
Fig. 9 shows separately in elevation a detail of the brake for preventing the pivoting movement.
Figure 11:
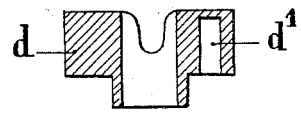
Fig. 11 is a vertical section of the member illustrated in Fig. 9.
Figure 13:
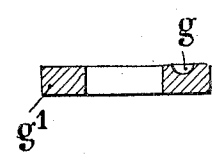
Fig. 13 shows apart, in vertical section, a detail of the above-mentioned brake.
Figure 10:
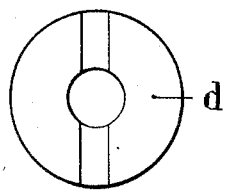
Fig. 10 is a plan view thereof.
Figure 12:
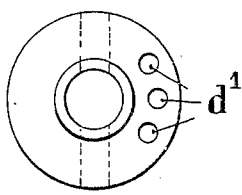
Fig. 12 is an underside view of the member shown in Fig. 9.
Figure 14:
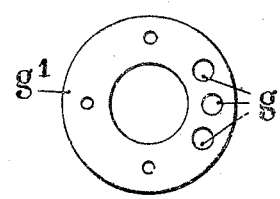
Fig. 14 is a plan view thereof.

As illustrated in the drawing, in this system of emergency seat, the pivot $a$ and the cone $a^1$ of the spindle or support $a^2$ are fitted in a kind of bearing $b$ provided at the front with a slot $b^1$ and secured under the floor $c$ of the car in any suitable manner.

Besides through the pivot $a$ passes a pin $a^3$ which prevents it from getting out of the bearing $b$; this pin can, however, enter into a slot $b^2$ when the spindle $a^2$ is folded forward.

This cone and pivot device allows also of causing the emergency seat to pivot in the bearing $b$.

After having passed through the bearing $b$, the pivot $a$ passes also through a ring $d$ rendered rigid with this pivot by the said pin $a^3$.

This ring $d$ forms a part of a brake and receives, in recesses $d^1$, bolts $e$ each pushed by a spring $f$ in small cavities $g$ provided in a washer $g^1$ rendered rigid with a fixed casing $i$ by a screw $h$.

This brake ensures a certain fixity of the pivot $a$ for preventing it from accidentally rotating under the action of the rolling motion of the car when the extended emergency seat is facing forward.

For permitting the adjustment of the forward projection of the seat $j$, the head of the spindle $a^2$ has a notched top member $a^4$ provided with side slides $a^5$ on which can move slide-blocks $j^1$ rigid with the seat $j$.

A stop device constituted by a small stud $k$ pushed by a spring $l$ arranged in a recess $a^6$ of the spindle $a^2$, maintains the seat $j$ at the degree of projection which has been given thereto by entering into one of a series of cavities $j^2$.

The frame $j^3$ of the back of the seat is pivoted on axes $j^4$ so that it can be bent forward when the emergency seat is folded.

The arch member of the back of the seat is telescopically arranged, so that it can be raised or lowered at will.

Screw sleeves $j^6$ acting on tubular slotted parts immobilize this arch member in the position given thereto.

When the emergency seat is caused to turn on itself, the pin $a^3$ moves under the bearing $b$ by drawing the movable ring $d$ with it.

For folding this emergency seat forward, it is first lifted so as to release the cone $a^1$ from the bearing $b$, this having for result to cause the upward movement of the pin $a^3$ in the slot $b^2$ of this bearing and to release the said pin from the ball brake. This being effected it suffices to fold the emergency seat forward by causing its spindle $a^2$ to pivot on the pin $a^3$. During this folding movement, the pivot $a$ of this spindle inclines in the slot $b^1$ provided at the front part of the bearing.

When this emergency seat is folded forward, that is to say when it is concealed or put out of the way, it occupies the position illustrated in Fig. 4.

The forms, details, accessories, materials and dimensions of this system of emergency seat can of course be varied without departing thereby from the principle of the invention.

I claim:—

1. A folding seat of the character described, comprising a spindle adapted to fold in a vertical plane, a seat support on the upper end of the spindle, a seat mounted on said support, a cone part on the spindle, a fixed conical socket for receiving said cone part when the seat is in the raised position, a movable member mounted in the fixed socket, means on the spindle for engaging the movable member, and means comprising a stationary part and a spring device for controlling the turning movement of the said movable member and of the seat, the spring device cooperating with the movable member and the stationary part.

2. A folding seat of the character described, comprising a spindle adapted to fold in a vertical plane, a seat support on the upper end of the spindle, a seat mounted on said support, a cone part on the spindle near the lower end thereof, a fixed conical socket for receiving the cone part when the seat is in the raised position, a front recess in the socket to receive the spindle when the latter is turned downwards, a movable member mounted in the fixed socket, means on the spindle for engaging the movable member, and means for controlling the turning movement of the seat, comprising a fixed part and a spring device cooperating with the said movable member.

3. A folding seat of the character described, comprising a spindle adapted to fold in a vertical plane, a seat on the upper end of the spindle, a cone part on the spindle near the lower end thereof, a fixed conical socket for receiving said cone part when the seat is in the raised position, a front recess in the socket to receive the spindle when the latter is turned downwards, guide means between the spindle and the socket to ensure engagement of the spindle with the said recess after disengagement of the cone part from the conical socket, and means for controlling turning movement of the seat, comprising a fixed member, a movable member connected to the spindle, and a spring device between said members.

4. A folding seat of the character described, comprising a spindle adapted to fold in a vertical plane, a seat support on the upper end of the spindle, a seat mounted on said support, spring means for retaining the seat in adjusted position on the support, a cone part on the spindle, a fixed conical socket for receiving the cone part when the seat is in the raised position, and means for controlling the turning movement of the seat, comprising a fixed member, a movable member connected to the spindle, and a spring device for controlling relative turning movement of said members.

5. A folding seat of the character described, comprising a spindle adapted to fold in a vertical plane, a seat support on the upper end of the spindle, a seat mounted on said support, a cone part on the spindle near the lower end thereof, a fixed socket with a conical part to engage the cone part of the spindle when the seat is in position for use, and with a front recess to receive the spindle when the latter is folded down, guiding means to permit vertical movement of the spindle without simultaneous turning movement, and means for controlling turning movement of the seat when in position for use, comprising a stationary member, a movable member adapted to turn with the spindle, and a spring device for controlling relative turning movement of the said members.

6. A folding seat of the character described, comprising a spindle adapted to fold in a vertical plane, a seat support on the upper end of the spindle, a seat mounted on said support, a cone part on the spindle, a fixed socket with a conical part to engage the cone part of the spindle when the seat is in position for use, and with a recess to receive the spindle when the latter is folded down, guiding means for permitting vertical movement of the spindle in the socket without relative turning movement, and means for controlling turning movement of the seat and spindle about a vertical axis without vertical movement, comprising a movable member in the said socket, spring pressed means in the movable member, means for preventing independent turning movement of the said movable member and the spindle, and a stationary part having recess for engagement with the said spring pressed means to frictionally retain the seat in adjusted position after rotation about the vertical axis.

The foregoing specification of my "pivoting emergency seat" signed by me this 18th day of December, 1925.

ARTHUR BOULOGNE.